United States Patent
Rick

(10) Patent No.: US 8,651,680 B2
(45) Date of Patent: Feb. 18, 2014

(54) OCCUPANT PROTECTION DEVICE FOR A VEHICLE

(75) Inventor: Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 12/883,101

(22) Filed: Sep. 15, 2010

(65) Prior Publication Data

US 2011/0116251 A1    May 19, 2011

(30) Foreign Application Priority Data

Sep. 16, 2009   (DE) .................. 10 2009 041 710

(51) Int. Cl.
*F21V 9/16* (2006.01)
*B60R 21/16* (2006.01)

(52) U.S. Cl.
USPC .............................. 362/84; 362/488; 280/731

(58) Field of Classification Search
USPC ............... 362/84, 487, 488, 489; 280/731
See application file for complete search history.

(56) References Cited

U.S. PATENT DOCUMENTS

| | | | |
|---|---|---|---|
| 4,608,550 A | | 8/1986 | Umebayashi et al. |
| 4,878,689 A * | 11/1989 | Mitzkus et al. ............... 280/731 |
| 6,739,620 B2 | | 5/2004 | Derrick |
| 6,848,706 B2 | | 2/2005 | Kreuzer et al. |
| 6,942,246 B2 * | 9/2005 | Hohne et al. ................. 280/731 |
| 7,441,801 B2 * | 10/2008 | Nakamura et al. ............ 280/731 |
| 7,997,612 B2 * | 8/2011 | Gulde ........................... 280/731 |
| 2003/0151235 A1 | 8/2003 | Hoehne et al. |
| 2005/0062271 A1 | 3/2005 | Heckl et al. |
| 2010/0176579 A1 | 7/2010 | Gulde |
| 2011/0109066 A1 * | 5/2011 | Rick et al. .................. 280/728.3 |

FOREIGN PATENT DOCUMENTS

| | | |
|---|---|---|
| DE | 19824420 A1 | 12/1999 |
| DE | 19904321 A1 | 8/2000 |
| DE | 20105002 U1 | 7/2001 |
| DE | 10133896 A1 | 1/2003 |
| DE | 20218732 U1 | 3/2003 |
| DE | 10246338 A1 | 5/2003 |
| DE | 10352566 A1 | 6/2005 |
| DE | 10353462 A1 | 6/2005 |
| DE | 102005004452 A1 | 8/2006 |
| DE | 102006062642 B3 | 8/2008 |
| DE | 102008011519 A1 | 9/2009 |
| EP | 1251044 A2 | 10/2002 |
| JP | 2000335280 A | 12/2000 |
| JP | 2009120192 A | 6/2009 |
| WO | 2007084031 A1 | 7/2007 |
| WO | 2008030143 A1 | 3/2008 |

OTHER PUBLICATIONS

German Search Report dated Mar. 25, 2010, issued in Application No. 10 2009 041 710.9.
British Search Report dated Dec. 16, 2010, issued in Application No. 1014929.2.

* cited by examiner

*Primary Examiner* — Stephen F Husar
*Assistant Examiner* — James Cranson, Jr.
(74) *Attorney, Agent, or Firm* — Ingrassia Fisher & Lorenz, P.C.

(57) ABSTRACT

An occupant protection device is provided for a vehicle that includes, but is not limited to at least one airbag module that is arranged in a hub region of a steering wheel. The airbag module includes, but is not limited to a visual surface facing a vehicle driver and the visual surface is entirely or partially formed of a textile.

26 Claims, 2 Drawing Sheets

OCCUPANT PROTECTION DEVICE FOR A VEHICLE

CROSS-REFERENCE TO RELATED APPLICATION

This application claims priority to German Patent Application No. 102009041710.9, filed Sep. 16, 2009, which is incorporated herein by reference in its entirety.

TECHNICAL FIELD

The invention relates to an occupant protection device for a vehicle with at least one airbag module that is arranged in a hub region of a steering wheel, wherein the airbag module has a visual surface facing a vehicle driver.

BACKGROUND

Airbag modules, which are arranged in a hub region of a steering wheel, are adequately known and are deployed in the event of a front-end collision of a vehicle to protect a vehicle driver. The airbag modules usually comprise at least one airbag that can be inflated with gas and an airbag module cover whose visual surface faces the vehicle driver. On activation of the airbag module the airbag module cover opens or breaks in order to make possible unfolding of the airbag in the direction of the vehicle driver.

Publication DE 199 04 321 A1, which most probably forms the closest state of the art, describes an occupant protection device with at least one steering wheel airbag that is arranged locationally fixed without co-rotating in the hub region of a steering wheel of a vehicle steering.

In view of the foregoing, at least one object of designing a vehicle interior attractively and in a design-oriented manner. In addition, other objects, desirable features and characteristics will become apparent from the subsequent summary and detailed description, and the appended claims, taken in conjunction with the accompanying drawings and this background.

SUMMARY

According to an embodiment of the invention, an occupant protection device is proposed that is suitable and/or designed for a vehicle. More preferably, the occupant protection device is designed for integration in a motor car. The occupant protection device comprises at least one airbag module that is arranged in a hub region of a steering wheel. Preferentially the airbag module comprises at least one gas generator and at least one airbag which are designed to unfold in the direction of a vehicle driver in the event of an accident, particularly in the event of a front-end collision. The airbag module furthermore comprises a visual surface facing the vehicle driver. Preferentially the visual surface of the airbag module forms the visual surface of a steering wheel center region.

The visual surface is completely or partially formed of a textile. Thus, the textile can cover the visual surface of the airbag module over its entire area or only in one or a plurality of regions and/or be joined with these. The region or regions in this case can have different sizes and/or shapes and/or form at least one sign, one symbol, one pattern, one character and/or one inscription on the visual surface. Optionally the visual surface is formed of a regularly or irregularly broken-through textile. More preferably the textile can be designed grid-like, wherein the grid can cover the visual surface over the full area or only partially.

Preferentially, the textile has a color configuration wherein the textile is designed in one color or multiple colors. Optionally, the textile can be designed with a pattern.

It is advantageous that through the embodiments of the invention a new image-forming design feature can be incorporated in the vehicle interior, more preferably on the steering wheel. Through different versions of the textile it is possible to adapt the visual surface in terms of fabric and/or color to the remaining vehicle interior and/or improve the haptic quality. The occupant protection device comprises an optionally included vehicle interior, more preferably vehicle seats, door coverings and/or an instrument panel, which at least in sections have the same textile as on the airbag module. Thus a young, fresh design can be guaranteed and the general spirit of the times or possible fashion trends taken into account. By matching the steering wheel design, particularly the visual surface of the airbag module to the remaining vehicle interior, a calming effect on the driver is achieved. As an additional advantage it must be mentioned that in many cases an expensive surface design such as painting of the visual surface of the airbag module can fall away and costs be saved in this manner.

In one embodiment of the invention, the airbag module and/or the hub region of the steering wheel is/are arranged in a fixed and/or stationary manner relative to a rotary movement of the steering wheel. Preferentially, the airbag module and/or the hub region of the steering wheel do/does not co-rotate with a steering wheel rim and not with steering wheel spokes. More preferably, the airbag module and/or the hub region is/are arranged locationally fixed and/or independently of an angle of rotation of the steering wheel rim and/or the steering wheel spokes.

A fixed airbag module and/or hub region of the steering wheel can have a particularly calming effect on the vehicle driver. In addition, the static position of operating elements on the airbag module can facilitate driving and steering. Combining the fixed airbag module with the visual surface of the airbag module according to the invention makes possible reinforcing the calming effect on the vehicle driver. Largely combining design elements with improved operation and ergonomics is additionally ensured.

Another embodiment of the invention provides that the textile is directly attached to the airbag module and/or an airbag module cover without intermediate layer, wherein the airbag module preferentially comprises the airbag module cover. The airbag module cover is usually designed and/or suitable for folding away, opening and/or making possible emergence of the at least one airbag from the airbag module on activation of the airbag module. For example, the textile can be stretched over the airbag module and/or the airbag module cover and/or be attached to the airbag module and/or the airbag module cover through other suitable methods or techniques such as gluing, clamping of the textile ends, sewing and/or buttoning and much more.

In another embodiment, the textile is attached to the airbag module cover indirectly with one or a plurality of intermediate layers. Preferentially, the textile comprises a substrate foil and/or coating and/or is joined with this/these. More preferably, the substrate foil and/or the coating are arranged on a side facing away from the visual surface and a side facing the airbag module. For example, the substrate foil and/or coating comprises a barrier layer and/or a composite material which is/are joined to the airbag module and/or the airbag module cover. Joining can optionally be performed through back-molding, gluing, coating, thermal heat introduction such as welding, lasering, etc., or through other suitable joining methods.

In another embodiment of the invention, the textile comprises fabrics, knitted fabrics, fibers and/or yarns. Preferentially, the textile comprises natural and/or artificial constituents. More preferably, the textile can comprise a flat structure comprising fibers and/or yarns such as for instance fabric, cloth, felt, and/or fleece. In an optional design the textile can also comprise a flock which describes short cut fibers which are applied to a bed of adhesive. It is quite possible that the visual surface is only formed of one textile or of a plurality of different textiles.

A further embodiment of the invention provides a light source which selectively and/or exclusively over the full area or partial area illuminates the visual surface and/or which back-illuminates the visual surface through emission of optical radiation over the full area or partial area and/or which is formed through area regions of the visual surface. The further subject of the invention can more preferably be also realized without the textile.

Preferentially, the light source is designed and/or arranged to be only assigned to the visual surface and/or to only illuminate the visual surface over the entire area or partial area. It is conceivable that the light source comprises one or a plurality of artificial illumination means. For example, the light source comprises one or a plurality of suitable illumination means such as for example light-emitting diodes. More preferably, the light source is arranged outside the airbag module and/or suitable for and/or designed for illuminating the visual surface from a front side, wherein the front side faces a vehicle driver. It is conceivable that the illumination is effected directly or indirectly, e.g., via reflectors.

It is possible that the light source comprises one or a plurality of displays and/or light-emitting diodes and/or luminous fibers such as for instance glass fibers. More preferably, the light source is integrated in the visual surface and/or an outer wall of the airbag module. Optionally, the light source is introduced in the visual surface and/or in the outer wall of the airbag module, preferentially the luminous fibers are molded and/or overmolded through a thermal injection molding method. If the textile forms the visual surface, the luminous fibers are more preferably introduced into the textile, for example the luminous fibers are sewn and/or woven into the textile. Preferentially the light source is suitable for and/or designed for illuminating the visual surface from a back side, wherein the back side faces the airbag module and/or faces away from the vehicle driver.

If area regions of the visual surface form the light source, the light source can comprise luminescent elements for example over the full area or part area, which elements are arranged on the visual surface or the textile and/or are joined with the visual surface or the textile. Optionally, the light source can comprise fibers having luminescence. Optionally, the fibers are designed phosphorescing and/or fluorescing and/or they have phosphorescing and/or fluorescing properties such as pigments and/or coatings. Preferentially, the fibers are introduced into the textile, more preferably sewn in and/or woven in. It is also possible that the visual surface or the textile comprises pigments and/or coatings comprising luminescence.

Optionally, the light source is suitable for and/or designed for illuminating the visual surface entirely in a pattern. Preferentially, the light source illuminates the visual surface in a regular or irregular pattern. For example the light source illuminates the visual surface over the entire area and/or entirely grid-like.

Another embodiment of the invention provides that the light source is suitable for and/or designed for illuminating the visual surface partially and/or in specific points. Thus, the light source can illuminate the visual surface only in one or a plurality of regions and/or sections. It is quite conceivable that the light source is suitable for and/or designed for illuminating the visual surface in one or a plurality of patterns. Preferentially, the patterns are arranged independently of one another and/or partially connected and/or completely connected. More preferably, the patterns can be arranged regularly or irregularly.

The light source is suitable for and/or designed for generating one or a plurality of signs, symbols, images, characters and/or inscriptions on the visual surface. The advantageous part of this is that future design concepts and strategies can be supported or realized and a formation of trademark image can be promoted.

In a further embodiment the light source is designed as information medium. For example, the light source can be suitable for and/or designed for generating an illumination in form of a trademark and/or trademark logo and/or generate flashing of a warning lamp on the visual surface and/or displaying alternating navigation data of a navigation system. As an advantage, expanded occupant protection or expanded information display through new types of design-oriented easily visible information media must be mentioned.

A further possible embodiment of the invention provides that the light source is suitable for and/or designed for generating an illumination that is variable with respect to time. For example, the light source can emit light in alternating colors and/or show alternating displays. Thus, a certain sign, image or symbol can be displayed at a point in time and after a certain time another sign, image or symbol.

Optionally, the textiles or constituents of the textile comprise regions of luminescence. Preferentially, the textile or its constituents emit light and/or gives off optical radiation on a suitable excitation. More preferably, the textile or its constituents are designed phosphorescing and/or fluorescing. Thus the textile or its constituents can comprise for example phosphorescing and/or fluorescing pigments or coatings. Alternatively or supplementarily, filaments or fibers having luminescence can be incorporated.

In a further embodiment of the invention, the textile comprises finishing elements. Preferentially, the finishing elements comprise one or a plurality of stampings, ornaments, embellishments, sewn-on elements or woven-in elements, e.g. also with contrast filaments. The finishing elements can represent one or a plurality of different shapes, symbols, emblems, images, characters and/or inscriptions. Thus, through the finishing element, the textile can for example comprise a horn symbol and/or an airbag inscription and/or a trademark logo.

This design has the advantage that the textile can serve as an information carrier. In many cases it is possible to achieve a function combination. Since on the steering wheel or the airbag module and/or the airbag module cover one or a plurality of attached information carriers such as for instance trademarks or horn symbols are already arranged through finishing elements, additional information carriers can be omitted. This results in a reduction of the number of components and thus cost saving. In addition, an individual design of the textile according to customer requests can possibly be affected and competitive advantages secured in this way.

In a further embodiment, the textile comprises a protective layer. Preferentially, the protective layer is arranged on the top side of the textile and provides protection from dirt accumulation, wear and/or yellowing. More preferably, the protective layer is formed through impregnation and/or a Teflon, nano, Top Tec and/or paint coating. The protective layer can be sprayed on, brushed on, painted on or applied to the textile by any other suitable method. Thus the protective layer advantageously provides longevity with never changing attractive appearance.

A further embodiment of the invention provides that the textile is stretched over a region in which a tear-open seam or an airbag module cover is arranged. The tear-open seam is suitable for and/or designed for tearing on activation of the airbag module. The tear-open seam for example is a region of weak material of the airbag module cover and/or an opening region of the airbag module cover and/or a predetermined breaking point in the material of the airbag module cover.

It is conceivable that the textile in the region of the tear-open seam comprises a weakening which is preferentially arranged on the bottom side. The weakening can for example be incorporated through a mechanical method such as a laser treatment. Through the tearing-open of the textile, unobstructed unfolding of the airbag in the direction of the vehicle driver can be ensured. Providing the weakening on the bottom side provides the advantage that the design of the visual surface is not impaired.

It is particularly preferred however that the textile does not comprise any weakening. More preferably, the textile is suitable for and/or designed for tearing in the region of the tear-open seam even without weakening on activation of the airbag module. Preferentially, the textile comprises a flat fabric of fibers and/or microfibers such as for example fleece and/or Alcantara, since these flat fabrics can tear even without weakening. It is advantageous that in designing the textile without weakening a manufacturing step can be saved and cost saving can thus be utilized.

A further embodiment of the invention provides that the textile comprises cut and/or joint locations on the tear-open seam. Preferentially, the textile does not span the tear-open seam, more preferably the textile abuts the tear-open seam on one or a plurality of sides. This configuration has the advantage that it does not have any hampering influence on the tear-open characteristic of the airbag module cover. Thus, functional and design elements are combined in an advantageous manner.

In a further embodiment of the invention, the textile comprises a detachment protection on the cut and/or joint locations. Preferentially, the detachment protection comprises a constructive design that is suitable to avoid laying-open and/or standing proud of the cut and/or joint locations of the textile of the airbag module cover and/or airbag module cover. The cut and/or joint locations are for example bordered by an extension on the airbag module and/or on the airbag module cover or integrated in a bead and/or groove and/or depression of the airbag module and/or the airbag module cover. Optionally, the textile can be wrapped and/or folded about the airbag module and/or the airbag module cover.

It is particularly preferred that the airbag module and/or the airbag module cover is reduced in its thickness by a height of the textile and smooth transitions to the interior elements following the airbag module and/or the airbag module cover can be achieved. The detachment protection provides an improvement of the longevity and/or durability of the textile or the visual surface in an advantageous manner. Thus, a quality improvement can be achieved and complaints avoided.

A further embodiment of the invention provides that the airbag module cover is releasably arranged on the airbag module. Preferentially, the airbag module cover is designed to be removed from the airbag module without damage. More preferably, the airbag module cover is hooked into, engaged in, screwed to or releasably connected to the airbag module using other suitable fastening means.

An advantage of the releasable arrangement is that replacement of the airbag module cover can be performed without problem. This can be beneficial particularly in the event of damage to the airbag module cover and/or its visual surface. It is also particularly advantageous that it allows a customer to follow design trends and satisfy the customer's own taste in that he can decide on a different design of the visual surface of the airbag module cover even after the purchase of a vehicle. Thus, individual, changing customer wishes can also be satisfied in after sales business.

In a further embodiment of the invention, the airbag module and/or the steering wheel comprises a metal component, wherein there is an electrically conductive connection between the component and the textile. Preferentially, the connection is effected via electrically conductive filaments, cables or ribbons which optionally tear on activation of the airbag module. It is also conceivable that the textile and/or the airbag module cover comprise/s electrically conductive components such as for example fibers, more preferably carbon fibers. These can for example be incorporated in and/or woven into and/or sewn into the textile. It is likewise optionally possible that the intermediate layer of the textile and/or the protective layer is designed in an electrically conductive manner. Combinations of the mentioned possibilities are likewise conceivable. It is advantageous that electrostatic charging of the textile, which can for example develop through friction, is averted in that the charge is safely and evenly discharged.

In another embodiment, the earthed metal component is suitable for and/or designed for averting the electrostatic charging of the textile and simultaneously serve as power supply for the light source. This function combination has the advantage that additional components can be saved and costs reduced.

BRIEF DESCRIPTION OF THE DRAWINGS

The present invention will hereinafter be described in conjunction with the following drawing figures, wherein like numerals denote like elements, and:

FIG. 2b a section through the airbag module and the airbag module cover from FIG. 2a.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
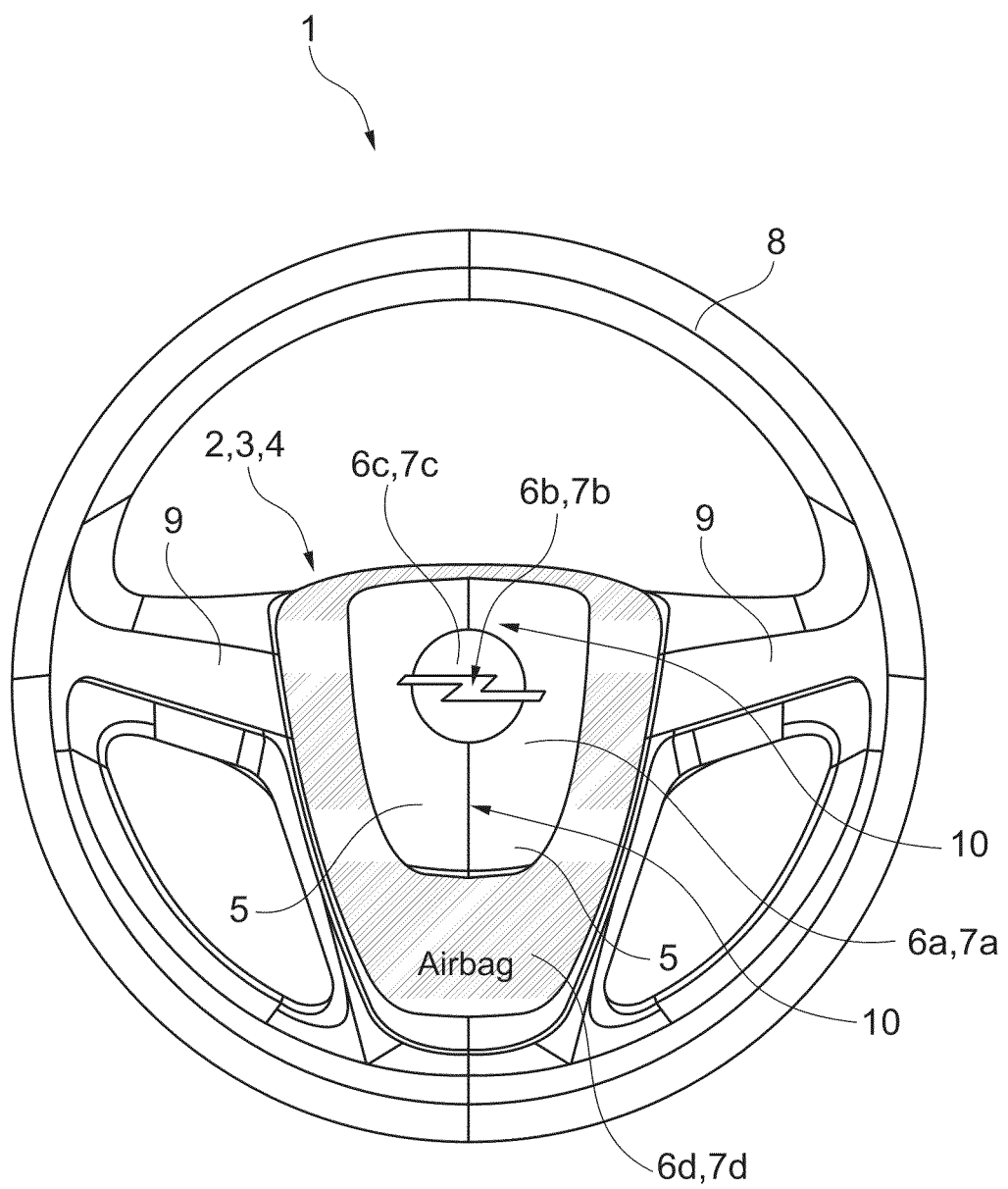
FIG. 1 is a top view of a steering wheel with an occupant protection device.

An embodiment of the invention is shown in FIG. 1, which shows a top view of a steering wheel 1 with an occupant protection device 2. The steering wheel 1 is arranged in an interior of a vehicle in front of a vehicle driver.

The occupant protection device 2 comprises an airbag module 3 which is arranged in a hub region 4 of the steering wheel 1. The airbag module 3 comprises at least one gas generator, at least one airbag and 1 airbag module cover 5. In the event of a collision of the vehicle, gas flows from the at least one gas generator into the at least one airbag, upon which said airbag expands and opens the airbag module cover 5 in the direction of the vehicle driver.

The airbag module 3 comprises a visual surface 6. More preferably the visual surface 6 faces the vehicle driver. The visual surface 6 is completely or partially formed of a textile 7.

The airbag module 3 and/or the hub region 4 of the steering wheel 1 is/are arranged fixed, i.e. they do not follow a steering movement of a steering wheel rim 8 and steering wheel spokes 9. More preferably, the airbag module 3 and/or the hub region 4 is/are arranged independently of an angle of rotation of the steering wheel rim 8 and the steering wheel spokes 9.

The textile 7 is directly attached to and/or fastened to the airbag module 3 and/or the airbag module cover 5, more preferably the textile 7 has no intermediate layer. Fastening to the airbag module 3 and the airbag module cover 5 is preferentially affected through an adhesive material and/or through sewing and/or buttoning and/or clamping of the textile ends, etc.

The textile 7 additionally spans a region in which a tear-open seam 10 of the airbag module cover 5 is arranged. In this way, the tear-open seam 10 is arranged not visible to the vehicle driver. On the tear-open seam 10 the airbag module cover 5 breaks open on activation of the airbag module 3 and guarantees emergence of the at least one inflated airbag from the airbag module 3.

The textile 7 comprises fibers, the textile 7 is more preferably designed as a fleece material, e.g., Alcantara. The textile 7 is designed to tear on activation of the airbag module 3, since flat fabrics with fibers are usually suitable for and/or designed for tearing without any weakening incorporated therein beforehand. More preferably, the tear occurs in the region of the tear-open seam 10 in order to guarantee free unfolding of the at least one airbag in the direction of the vehicle driver.

The textile 7 comprises a woven-in element with conductive fibers which for instance have a high carbon component. These fibers generate a continuous discharge of an electric charge of the textile 7. Furthermore, the textile 7 comprises a protective layer, more preferably it comprises an impregnation and/or a Teflon, nano, top tec and/or paint coating in order to protect it from wear and/or fading.

The visual surface 6 is divided into the visual surface sections 6a, 6b, 6c, 6d, which are formed by the textile part areas 7a, 7b, 7c and 7d. The visual surface sections 6a, 6b and 6c are arranged on the airbag module cover 5, the visual surface section 6d on the airbag module 3.

The visual surface section 6a is formed by the textile part area 7a. This is directly back-illuminated through an artificial light source. The artificial light source is one or a plurality of LEDs, which is arranged on a back side of the textile part area 7a and/or the visual surface section 6a facing the airbag module 3. Optionally the LED/LEDs can be arranged in a clearance on the outer wall of the airbag module 3 or the airbag module cover 5. It is likewise possible that the artificial light source comprises luminous fibers which are sewn and/or woven into the textile part area 7a. Furthermore, the textile part area 7a comprises finishing elements in form of stampings and/or woven-in elements with contrast filaments.

The visual surface section 6b is formed through the textile part area 7b. The textile part area 7b forms the light source, more preferably the textile part area 7b emits optical radiation. Preferentially the light source and/or the textile part area 7b comprise/s fibers having luminescence. The fibers for instance have a fluorescing and/or phosphorescing pigment. The fibers are arranged in the textile part area 7b in the shape of a flash of lightning, more preferably they are sewn-in and/or woven-in in the shape of a flash of lightning. It is also conceivable that the textile part area 7b is treated with a coating in the shape of a flash of lightning which coating has fluorescing and/or phosphorescing properties. Because of this it is achieved that the light source emits light in the shape of a flash of lightning.

The visual surface section 6c is formed by the textile part area 7c. It surrounds the flash of lightning arranged in the textile part area 7b largely in a circular shape, is designed in one color and without pattern. A light source is suitable for and/or designed for illuminating the textile part area 7b via reflectors at regular intervals following activation. The activation can for example be effected through actuating a hazard warning lamp. More preferably, the light source flashes in synchronization with the hazard warning lamp. If the hazard warning lamp is not actuated, the textile part area 7b remains un-illuminated.

The visual surface section 6d is formed through the textile part area 7d which completely covers the airbag module 3 grid-like.

Optionally, the textiles 7a, 7b, 7c and/or 7d can fall away, more preferably the visual surface 6 can in sections or completely be formed of another material such as for example plastic, leather or metal. It is conceivable that the visual surface 6 is illuminated through a display integrated in the visual surface, which for example is designed as an information display of a navigation system.

Figure 2A:
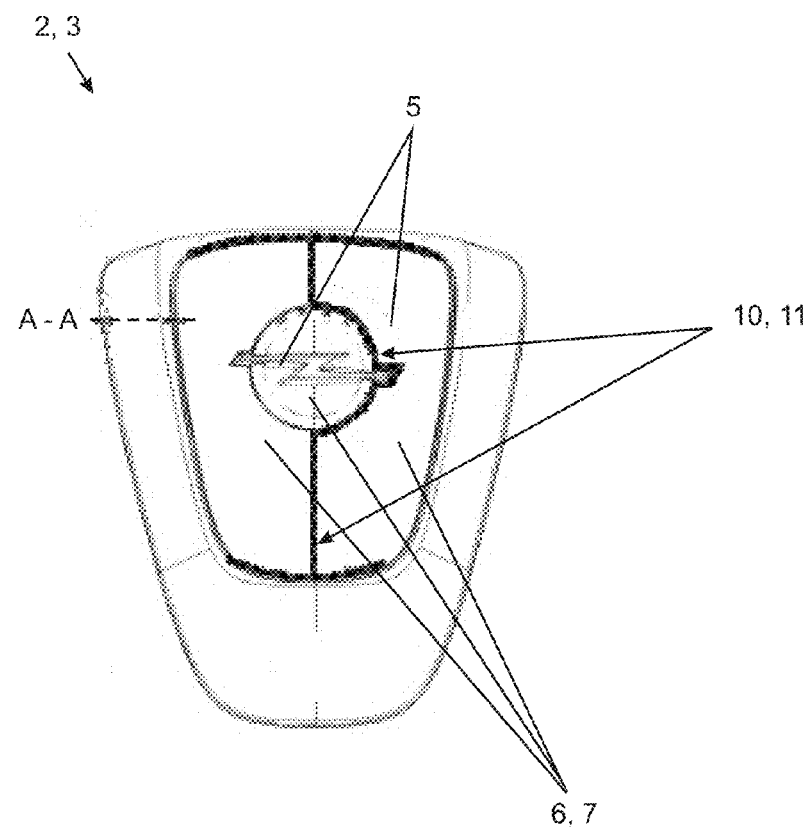
FIG. 2a a modification of the occupant protection device from FIG. 1, more preferably a top view of an airbag module and an airbag module cover.

FIG. 2a shows a modification of the occupant protection device 2 from FIG. 1, wherein a top view of the airbag module 3 from FIG. 1 is shown. Corresponding or identical parts are each provided with the same reference characters in the figures.

The airbag module 3 comprises an earthed metal component, preferentially a cable, which averts electrostatic charging of the textile 7 and simultaneously serves as a power feed line for the artificial light sources.

The textile 7 is indirectly attached to the airbag module cover 5. The textile 7 comprises an intermediate layer which is arranged on the side facing away from the vehicle driver. The intermediate layer is arranged not visible to the vehicle driver. It is joined to the airbag module cover 5 in a materially connected manner through a thermal joining method.

In the region of the tear-open seam 10 the textile 7 comprises cut and/or joint locations 11, more preferably the textile 7 does not span the tear-open seam 10 so that the tear-open seam 10 is arranged visible to the vehicle driver.

Figure 2B:
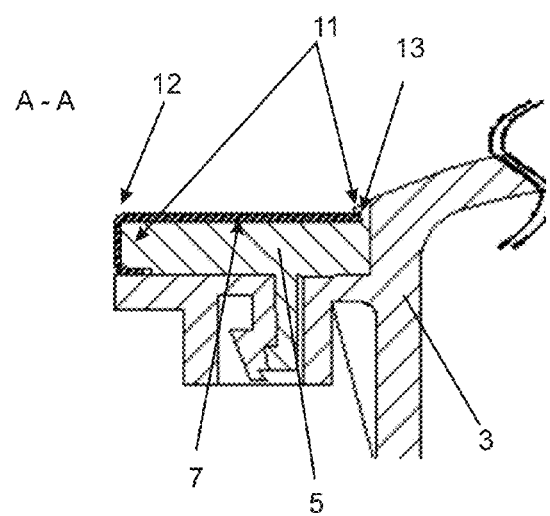

FIG. 2b shows a section through the airbag module 3 from FIG. 2a. The airbag module cover 5 is releasably arranged on the airbag module 3, preferentially the airbag module cover 5 is hooked into and/or engaged in the airbag module 3. More preferably, the airbag module cover 5 can be removed without damage for example for repair or replacement purposes and reinstalled again and/or replaced with another airbag module cover 5 likewise designed differently.

The cut and/or joint locations 11 comprise a detachment protection. The detachment protection 11 is formed on a first end 12 of the textile 7 as a wrap of the textile 7 about the airbag module cover 5 and on a second end 13 of the textile 7 as an extension of the airbag module 3, which protrudes over the second end 13. Alternatively the detachment protection 11 can also be designed as a border of the textile 7, e.g., through back-molding and/or as a bead and/or a groove on the airbag module 3 and/or the airbag module cover 5, into which the textile 7 protrudes on one or both ends. It is to be understood, that other combinations of the different variants are also possible.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An occupant protection device for a vehicle, comprising:
   an airbag module arranged in a hub region of a steering wheel, the airbag arranged in a stationary manner such that it is independent of the rotation of the steering wheel; and
   a visual surface of the airbag module facing a driver position,
   wherein the visual surface is at least partially formed of a textile.

2. The occupant protection device according to claim 1, wherein the textile partially comprises electrically conductive fibers.

3. The occupant protection device according to claim 1, wherein the textile is attached with an intermediate layer to the airbag module.

4. The occupant protection device according to claim 1, wherein the textile is attached with an intermediate layer to an airbag module cover.

5. The occupant protection device according to claim 1, wherein the textile comprises a woven fabric.

6. The occupant protection device according to claim 1, wherein the textile comprises a knitted fabric.

7. The occupant protection device according to claim 1, wherein the textile comprises a yarn.

8. The occupant protection device according to claim 1, further comprising a light source configured to illuminate the visual surface.

9. The occupant protection device according to claim 1, further comprising a light source configured to back-illuminate the visual surface.

10. The occupant protection device according to claim 8, wherein the light source comprises a light-emitting diode.

11. The occupant protection device according to claim 8, wherein the light source comprises a plurality of luminescent elements.

12. The occupant protection device according to claim 8, wherein the light source is configured to illuminate the visual surface entirely in a pattern.

13. The occupant protection device according to claim 8, wherein the light is adapted configured to illuminate the visual surface partially in a specific point.

14. The occupant protection device according to claim 8, wherein the light source is adapted configured to generate a sign.

15. The occupant protection device according to claim 8, wherein the light source is configured to generate a symbol.

16. The occupant protection device according to claim 8, wherein the light source is configured to generate an image.

17. The occupant protection device according to claim 8, wherein the light source is configured to generate a character.

18. The occupant protection device according to claim 8, wherein the light source is configured to generate a pattern.

19. The occupant protection device according to claim 8, wherein the light source is configured to generate an inscription.

20. The occupant protection device according to claim 8, wherein the light source is an information medium.

21. The occupant protection device according to claim 8, wherein the textile comprises a luminescent region as the light source.

22. The occupant protection device according to claim 1, wherein the textile comprises a refinement element.

23. The occupant protection device according to claim 1, wherein the textile comprises a protective layer.

24. The occupant protection device according to claim 4, wherein the airbag module cover is releasably arranged on the airbag module.

25. The occupant protection device according to claim 1, wherein the airbag module comprises an earthed metal component and between the earthed metal component and the textile is an electrically conductive connection.

26. The occupant protection device according to claim 1, wherein the steering wheel comprises an earthed metal component and the earthed metal component and the textile is an electrically conductive connection.

* * * * *